United States Patent Office 2,865,771
Patented Dec. 23, 1958

2,865,771

BRONZE-RESISTANT COMPOSITIONS COMPRISING TETRABROMOFLUORESCEIN LEAD SALT AND PREPARATION THEREOF

James F. Thompson, deceased, late of Cincinnati, Ohio, by Edna Weaver Thompson, executrix, Cincinnati, Ohio, assignor to Sterling Drug Inc., New York, N. Y., a corporation of Delaware No Drawing. Application June 7, 1956
Serial No. 589,886

20 Claims. (Cl. 106—23)

This invention relates to new and improved organic pigment compositions, to printing ink pigment pastes and printing inks comprising said pigment compositions, and to a method for the production thereof.

As is well known, heat-set inks containing the lead salt of 2,4,5,7,-tetrabromo-3,6-fluorandiol (tetrabromofluorescein), one of the pigments sometimes designated as "Phloxine Toners" or "Bronze Reds," normally discolor on printing to a brownish shade due to bronzing on heat treatment. This characteristic is undesirable, of course, because the prints thus obtained do not retain the normal red color of the pigment, instead acquiring a brownish cast, and also have a low gloss.

Accordingly, an object of the present invention is the provision of new pigment compositions comprising the lead salt of 2,4,5,7-tetrabromo-3,6-fluorandiol which have anti-bronzing properties and which when incorporated into printing ink vehicles yield bronze-resistant heat-set printing ink pigment pastes and printing inks.

The novel pigment compositions of this invention comprise the lead salt of 2,4,5,7-tetrabromo-3,6-fluorandiol having admixed therewith, in amounts sufficient to impart anti-bronzing properties to said compositions, minor weight proportions of a rosin amine and an acid red dye of the class consisting of halofluoresceins, Acid Alizarin Red B, Colour Index No. 216, and Violamine B, Colour Index No. 757.

The rosin amines useful as components in the pigment compositions of this invention are a well-known and readily available class of amines derived from rosin acids and containing a condensed tricylic hydroaromatic nucleus. These amines are obtained, for example, by treatment of a resin acid with ammonia to form a resin acid nitrile which is then hydrogenated to yield the rosin amine, or by treatment of a rosin aldehyde with ammonia and hydrogen; for instance see U. S. Patents 2,520,-901, 2,543,207, and 2,553,396. Representative specific examples of the rosin amines useful in the practice of my invention include dehydroabietylamine, tetrahydroabietylamine, dihydroabietylamine, dextropimarylamine, dihydrodextropimarylamine, abietylamine, and mixtures of these compounds. A mixture of rosin amines in which the major components are the first four amines listed above is available commercially under the name "Rosin Amine D," which is described for example by J. N. Borglin in Soap and Sanitary Chemicals 23, 147, 149, 167 (December 1947). This product is a viscous, pale yellow liquid with a density of 0.997 at 25° C.; boiling range, 187-211° C. at 5 mm.; refractive index, 1.5410 at 20° C.; neutralization equivalent, 317; and nitrogen content, 4.2–4.5%.

As indicated above, the acid red dye employed in minor weight proportion in the new pigment compositions is Acid Alizarin Red B, Colour Index No. 216, or Violamine B, Colour Index 757, or a halofluorescein. The halofluoresceins are a well-known class of dyes which are the halo-3,6-fluorandiols; these include for example 4,5-dibromo-3,6-fluorandiol (dibromofluorescein), 2,4,5,7-tetrabromo-3,6-fluorandiol (tetrabromofluorescein), 12,13,14,15 - tetrachloro-3,6-fluorandiol (tetrachlorofluorescein), 2,4,5,7 - tetrabromo - 12,13,14,15 - tetrachloro-3,6 - fluorandiol (tetrabromotetrachlorofluorescein), 2,4,5,7-tetraiodo-3,6-fluorandiol (tetraiodofluorescein), 2,4,5,7-tetrachloro - 12,13,14,15 - tetraiodo-3,6-fluorandiol (tetrachlorotetraiodofluorescein), diiodotetrachlorofluorescein, and the like. Although in some instances it may be advantageous to employ the same halofluorescein as that involved in the lead salt, i. e. 2,4,5,7-tetrabromo-3,6-fluorandiol, it is generally preferable to use a different halofluorescein. The choice in each case will depend in large part on the shade desired in the red pigment composition. A preferred halofluorescein in the practice of this invention is 2,4,5,7-tetrabromo-12,13,14,15-tetrachloro-3,6-fluorandiol.

The acid red dye can be used in its free acid form or, equivalently and frequently more conveniently, in the form of a water-soluble salt such as an alkali metal or ammonium salt.

The rosin amine and the acid red dye used to impart anti-bronzing properties to the compositions of this invention are ordinarily mixed with the lead salt of 2,4,5,7-tetrabromo-3,6-fluorandiol in amounts of about 1–10% each by weight of the lead salt. The use of either or both of the rosin amine and the acid red dye in amounts less than 1% affords some reduction of the bronzing of the lead salt but ordinarily does not afford the fullest advantage of the invention, while the use of amounts greater than 10% of either or both of these ingredients does not usually result in any additional improvement as to reduction of bronzing. Generally speaking, it was found that the use of approximately equal amounts by weight of the rosin amine and the acid red dye afforded the best results and for most purposes the use of about 5% of each was satisfactory. If desired, these two components can be added as the rosin ammonium salt of the acid red dye with optional addition of an excess of either the rosin amine or the acid red dye used as reactants in forming the salt.

The pigment compositions are readily prepared by mixing the various above-described ingredients in any desired order by conventional blending procedures.

A particularly preferred group of the pigment compositions comprises the lead salt of 2,4,5,7,-tetrabromo-3,6-fluorandiol (tetrabromofluorescein) and minor weight proportions, sufficient to impart anti-bronzing properties, of a rosin amine, for instance the mixture available as Rosin Amine D, and a tetrabromotetrachlorofluorescein, such as the sodium salt of 2,4,5,7-tetrabromo-12,13,14,15-tetrachloro-3,6-fluorandiol.

If desired, a small amount, for example up to about 5% by weight, of the lead salt of 2,4,5,7-tetrabromo-3,6-fluorandiol can be replaced by the lead salt of 4,5-dibromo-3,6-fluorandiol.

The novel pigment compositions of this invention can be incorporated into heat-set printing ink vehicles in conventional manner to form low-bronze printing ink pigment pastes or printing inks, as desired, of the invention. Thus, for example, the new pigment compositions are dispersed in the appropriate amount of a heat-set printing ink varnish, that is, a varnish which comprises a solvent, preferably a high-boiling (e. g. 400–600° F.) liquid hydrocarbon, and a resinous binder. The hydrocarbon solvent can be, for example, aliphatic petroleum fractions distilling in the ranges 470–500° F., 535–600° F., 500–535° F., or the like. The resinous binder is preferably a rosin-type binder substantially soluble in the hydrocarbon solvent such as a rosin modified with an alpha, beta-unsaturated organic polybasic acid such as maleic or fumaric acid, a lime-modified resin, a maleic-modified rosin ester, and the like. However, other resinous binders such as Utah fossil resin can also be used. Preferably, the binder is neutral or has a low acid number, having for example an acid number in the range 0–30. Addition of a small portion of a different type of binder, for example ethyl cellulose, to the above binders is sometimes advantageous.

Instead of mixing all three of the components, i. e. the lead salt, the rosin amine, and the acid red dye together to form the pigment composition and then dispersing this composition in the ink vehicle, alternatively the printing ink pigment pastes and printing inks are obtained by mixing the components thereof in any other desired order. For instance, the rosin amine and the acid red dye can be dispersed in a heat-set printing ink varnish and the lead salt of 2,4,5,7-tetrabromo-3,6-fluorandiol then added to the mixture to form the printing ink paste or ink.

When heat-set printing inks prepared in accordance with this invention are used, there are obtained prints which show substantially less bronzing and a much higher gloss than the prints obtained with similar inks containing the lead salt of 2,4,5,7-tetrabromo-3,6-fluorandiol but prepared without the addition of the rosin amine and the acid red dye anti-bronzing components.

The invention is illustrated by the following examples without, however, being limited thereto. The parts are by weight.

Example 1

To 1200 parts of an aqueous pulp consisting of 300 parts of the lead salt of 2,4,5,7-tetrabromo-3,6-fluorandiol and 900 parts of water there was added 15 parts of the sodium salt of 2,4,5,7-tetrabromo-12,13,14,15-tetrachloro-3,6-fluorandiol and after mixing well there was added 15 parts of a mixture of rosin amines (the product available commercially as Rosin Amine D). After thorough mixing at room temperature (about 75° F.), the red pigment composition (330 parts) was flushed into 670 parts of a heat-set vehicle consisting of 368 parts of the pentaerythritol ester of rosin (Pentalyn G; acid number 16) and 302 parts of an aliphatic hydrocarbon fraction (kerosene) of boiling range 535–600° F. to form a red printing ink pigment paste.

A heat-set printing ink was prepared by mixing 50 parts of the pigment paste obtained as described above with 25 parts of a printing ink varnish consisting of 12.5 parts of maleic modified rosin (Pentalyn K; acid number 20) and 12.5 parts of an aliphatic hydrocarbon fraction (kerosene) of boiling range 470–500° F. and 25 parts of a printing ink varnish consisting of 12.0 parts of phenolic-modified rosin (Durez 220; acid number, 18), 12.0 parts of kerosene, boiling range 470–500° F., and 1 part of aluminum octanoate. The resulting ink when printed and set produced prints having low bronze and high gloss, as contrasted with the dull, bronzy prints produced by a similar ink prepared using all of the same constituents except the Rosin Amine D and the sodium salt of 2,4,5,7-tetrabromo-12,13,14,15-tetrachloro-3,6-fluorandiol.

Example 2

Using the same quantities of all of the ingredients as described above in Example 1, the mixing and flushing procedure was varied by placing the rosin amine mixture and the sodium salt of 2,4,5,7-tetrabromo-12,13,14,15-tetrachloro-3,6-fluorandiol in the heat-set vehicle first, then adding the lead salt pulp and flushing. The red printing ink pigment paste obtained in this manner and the heat-set printing ink prepared therefrom were substantially identical in properties with the corresponding paste and inks prepared by the formulating method set forth in Example 1.

Example 3

When the procedure of Example 1 above was repeated but using 30 parts of Rosin Amine D and 30 parts of the sodium salt of 2,4,5,7-tetrabromo-12,13,14,15-tetrachloro-3,6-fluorandiol, the resulting red pigment composition, printing ink pigment paste, and printing ink all were found to have substantially the same anti-bronzing properties as the corresponding products of Example 1. These compositions were slightly bluer in shade than the products of Example 1.

Example 4

Proceeding in the same manner as described above in Example 1, but using, instead of the lead salt of 2,4,5,7-tetrabromo-3,6-fluorandiol alone, a mixture of 237.5 g. of the lead salt of 2,4,5,7-tetrabromo-3,6-fluorandiol and 12.5 g. of the lead salt of 4,5-dibromo-3,6-fluorandiol, there was obtained a red pigment composition with anti-bronzing properties which when flushed into a heat-set varnish consisting of equal parts of maleic-modified rosin (Pentalyn K; acid number 20) and an aliphatic hydrocarbon fraction (kerosene) of boiling range 470–500° F. produced a low-bronze printing ink pigment paste suitable for incorporation into a heat-set printing ink. The ink obtained, which was slightly darker in mass-tone and yellower in shade than the ink obtained in Example 1, had good anti-bronzing properties.

Example 5

To 2000 parts of an aqueous pulp consisting of 500 parts of the lead salt of 2,4,5,7-tetrabromo-3,6-fluorandiol and 1500 parts of water there is added 50 parts of the tetrahydroabietylamine salt of 2,4,5,7-tetrabromo-3,6-fluorandiol. After thorough blending of the mixture at room temperature (about 75° F.) the red pigment composition (550 parts) is flushed into 1000 parts of a heat-set vehicle consisting of 480 parts of phenolic-modified rosin (Durez 220; acid number, 18), 480 parts of kerosene boiling at 470–500° F., and 10 parts of aluminum octanoate to form a printing ink pigment paste. By mixing 500 parts of this paste with a solution of 250 parts of maleic-modified rosin (Pentalyn K; acid number, 20) in 250 parts of kerosene boiling at 470–500° F. there is obtained a heat-set printing ink which gives prints having low bronze and high gloss.

Example 6

Proceeding as described above in Example 1 but using, instead of the sodium salt of 2,4,5,7-tetrabromo-12,13,14,15-tetrachloro-3,6-fluorandiol, 15 g. of Acid Alizarin Red B, Colour Index No. 216, there were obtained a red pigment composition, a printing ink pigment paste, and a heat-set printing ink, each of which had anti-bronzing properties similar to the corresponding compositions of Example 1. These compositions were yellower in shade than the products of Example 1.

Example 7

Substituting 15 g. of Violamine B, Colour Index No. 757, for the sodium salt of 2,4,5,7-tetrabromo-12,13,14,15-tetrachloro-3,6-fluorandiol but otherwise proceeding in accordance with the operative details set forth in Example 1 above, there were obtained a red pigment paste, a printing ink pigment paste, and a heat-set printing ink having anti-bronzing properties, and the ink produced prints having low bronze and high gloss. These compositions were very blue in shade as compared to the products of Example 1.

What is claimed and desired to protect by Letters Patent is:

1. A pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of an acid red dye of the class consisting of Acid Alizarin Red B, Violamine B, and halo-3,6-fluorandiols.

2. A pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of a halo-3,6-fluorandiol.

3. A pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of Acid Alizarin Red B.

4. A pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of Violamine B.

5. A pigment composition containing a red pigment having antibronzing properties consisting essentially of the lead salt of 2,4,5,7-tetrabromo-3,6-fluorandiol mixed with about 1–10% by weight of a mixture of rosin amines comprised chiefly of dehydroabietylamine, tetrahydroabietylamine, dihydroabietylamine and dextropimarylamine, and about 1–10% by weight of 2,4,5,7-tetrabromo-12,13,14,15-tetrachloro-3,6-fluorandiol.

6. A pigment paste suitable for incorporation into a printing ink which comprises a heat-set printing ink varnish and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of an acid red dye of the class consisting of Acid Alizarin Red B, Violamine B, and halo-3,6-fluorandiols.

7. A pigment paste suitable for incorporation into a printing ink which comprises a heat-set printing ink varnish and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of a halo-3,6-fluorandiol.

8. A pigment paste suitable for incorporation into a printing ink which comprises a heat-set printing ink varnish and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of 2,4,5,7-tetrabromo-12,13,14,15-tetrachloro-3,6-fluorandiol.

9. A pigment paste suitable for incorporation into a printing ink which comprises a heat-set printing ink varnish and a pigment composition containing a red pigment having antibronzing properties consisting essentially of the lead salt of 2,4,5,7-tetrabromo-3,6-fluorandiol mixed with about 1–10% by weight of a mixture of rosin amines comprised chiefly of dehydroabietylamine, tetrahydroabietylamine, dihydroabietylamine and dextropimarylamine, and about 1–10% by weight of 2,4,5,7-tetrabromo-12,13,14,15-tetrachloro-3,6-fluorandiol.

10. A pigment paste suitable for incorporation into a printing ink which comprises a heat-set printing ink varnish and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of Acid Alizarin Red B.

11. A pigment paste suitable for incorporation into a printing ink which comprises a heat-set printing ink varnish and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of Violamine B.

12. A heat-set printing ink which comprises a solvent component, a heat-set printing ink varnish, and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of an acid red dye of the class consisting of Acid Alizarin Red B, Violamine B, and halo-3,6-fluorandiols.

13. A heat-set printing ink which comprises a solvent component, a heat-set printing ink varnish, and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of a halo-3,6-fluorandiol.

14. A heat-set printing ink which comprises a solvent component, a heat-set printing ink varnish, and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of Acid Alizarin Red B.

15. A heat-set printing ink which comprises a solvent component, a heat-set printing ink varnish, and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of Violamine B.

16. A heat-set printing ink which comprises a high-boiling liquid aliphatic hydrocarbon solvent, a resinous binder substantially soluble in said solvent, and a pigment composition containing a red pigment having antibronzing properties consisting essentially of the lead salt of 2,4,5,7-tetrabromo-3,6-fluorandiol mixed with about 1–10% by weight of a rosin amine and about 1–10% by weight of 2,4,5,7-tetrabromo-12,13,14,15-tetrachloro-3,6-fluorandiol.

17. A heat-set printing ink which comprises a high-boiling liquid aliphatic hydrocarbon solvent, a modified rosin binder substantially soluble in said solvent, and a pigment composition containing a red pigment having antibronzing properties consisting essentially of the lead salt of 2,4,5,7-tetrabromo-3,6-fluorandiol mixed with about 1–10% by weight of a mixture of rosin amines comprised chiefly of dehydroabietylamine, tetrahydroabietylamine, dihydroabietylamine, and dextropimarylamine, and about 1–10% by weight of 2,4,5,7-tetrabromo-12,13,14,15-tetrachloro-3,6-fluorandiol.

18. The method of reducing the bronzing properties of a heat-set printing ink composition having as the chief pigment constituent therein the lead salt of 2,4,5,7-tetrabromo-3,6-fluorandiol which comprises admixing with said composition about 1–10% by weight of a rosin amine and an acid red dye of the class consisting of Acid Alizarin Red B, Violamine B, and about 1–10% by weight of halo-3,6-fluorandiols.

19. The method of reducing the bronzing properties of a heat-set printing ink composition having as the chief pigment constituent therein the lead salt of 2,4,5,7-tetrabromo-3,6-fluorandiol which comprises admixing with said composition about 1–10% by weight of a rosin amine and about 1–10% by weight of a halo-3,6-fluorandiol.

20. The method of reducing the bronzing properties of a heat-set printing ink composition having as the chief pigment constituent therein the lead salt of 2,4,5,7-tetrabromo-3,6-fluorandiol which comprises admixing with said composition about 1–10% by weight of a rosin amine and about 1–10% by weight of 2,4,5,7-tetrabromo-12,13,14,15-tetrabromofluorescein.

References Cited in the file of this patent

UNITED STATES PATENTS

| | | |
|---|---|---|
| 2,567,963 | Petke | Sept. 18, 1951 |
| 2,567,964 | Petke | Sept. 18, 1951 |
| 2,567,965 | Petke | Sept. 18, 1951 |